(12) United States Patent
Lopez De Prado Lopez

(10) Patent No.: US 11,410,240 B2
(45) Date of Patent: Aug. 9, 2022

(54) TACTICAL INVESTMENT ALGORITHMS THROUGH MONTE CARLO BACKTESTING

(71) Applicant: Marcos M. Lopez De Prado Lopez, Abu Dhabi (AE)

(72) Inventor: Marcos M. Lopez De Prado Lopez, Abu Dhabi (AE)

(*) Notice: Subject to any disclaimer, the term of this patent is extended or adjusted under 35 U.S.C. 154(b) by 5 days.

(21) Appl. No.: 17/016,397

(22) Filed: Sep. 10, 2020

(65) Prior Publication Data

US 2021/0082046 A1  Mar. 18, 2021

Related U.S. Application Data

(60) Provisional application No. 62/899,164, filed on Sep. 12, 2019.

(51) Int. Cl.
| | |
|---|---|
| *G06Q 40/00* | (2012.01) |
| *G06Q 40/04* | (2012.01) |
| *G06Q 10/06* | (2012.01) |
| *G06N 7/00* | (2006.01) |
| *G06N 20/00* | (2019.01) |
| *G06Q 10/04* | (2012.01) |

(52) U.S. Cl.
CPC ............ *G06Q 40/04* (2013.01); *G06N 7/005* (2013.01); *G06N 20/00* (2019.01); *G06Q 10/04* (2013.01); *G06Q 10/067* (2013.01)

(58) Field of Classification Search
None
See application file for complete search history.

(56) References Cited

U.S. PATENT DOCUMENTS

2015/0066730 A1* 3/2015 Midmore ............... G06Q 40/04
705/37

OTHER PUBLICATIONS

Lu et al., "Order-Book Modelling and Market Making Strategies," Jun. 13, 2018.*

\* cited by examiner

*Primary Examiner* — Olabode Akintola

(57) ABSTRACT

Disclosed herein are methods and systems for computing optimized trading instructions, comprising applying a plurality of prediction models to compute trading instructions predicted to produce optimal outcomes based on received trading observations. Each prediction model is optimized, using a Monte Carlo algorithm, to predict optimal outcomes for a respective trading pattern based on a respective Data Generating Processes (DGPs). Weights are assigned to the prediction models according to probability scores computed for them according to mapping of the received trading observations to the DGPs associated with the prediction models and aggregated trading instructions are computed by aggregating, based on the weights, the trading instructions computed by the prediction models. Further disclosed are systems and methods for creating an ensemble of prediction models each optimized to predict optimal outcomes for a respective one of a plurality of trading patterns using an expanded simulated samples' dataset generated by a Monte Carlo algorithm.

12 Claims, 7 Drawing Sheets

TACTICAL INVESTMENT ALGORITHMS THROUGH MONTE CARLO BACKTESTING

RELATED APPLICATIONS

This application claims the benefit of priority under 35 USC § 119(e) of U.S. Provisional Patent Application No. 62/899,164 filed on Sep. 12, 2019, the contents of which are incorporated herein by reference in their entirety.

FIELD AND BACKGROUND OF THE INVENTION

The present invention, in some embodiments thereof, relates to training algorithms that produce positive investment performance and, more specifically, but not exclusively, to training a plurality of algorithms that produce optimal investment performance for a respective market pattern (regime).

Recent years have witnessed major advances made in the field of Machine Learning (ML) algorithms such as for example, neural networks, Support Vector Machines (SVM) and/or the like. Prediction models utilizing ML algorithms are thus becoming more accessible making them highly adopted in a vast and diverse range of research and practical applications spanning almost any aspect of modern life ranging from physical phenomena research, through pattern and object detection to statistical analysis and prediction.

The prediction models may be trained to learn input to output mapping functions in one or more of a plurality of learning methodologies, for example, supervised learning, semi-supervised, unsupervised learning and/or any combination thereof. During the training stage, the prediction model is trained using training data (sample data) such that it is fitted on the training data to learn how to map (i.e. classify and/or cluster) the training dataset to a plurality of labels, classes and/or clusters based on patterns identified in the training data and/or inferences derived from the training data.

The trained prediction models may be then applied on new (unseen) data samples to predict a probable mapping of these data samples to the classes, clusters and/or labels identified during training.

However, training the prediction models with a limited training dataset (samples) may lead to overfitting of the prediction models. There are two major types of overfitting, overfitting of the training set and overfitting of the testing set. Training overfitting may occur when a prediction model is trained to explain random variations in the dataset, as opposed to a regular pattern present in the dataset (population). Testing overfitting may occur when a prediction model is selected from a multiplicity of candidates because it appears to perform well on the testing set.

SUMMARY OF THE INVENTION

According to a first aspect of the present invention there is provided a computer implemented method of computing optimized trading instructions, comprising:

Receiving a dataset comprising a plurality of trading observations.

Applying a plurality of prediction models to compute trading instructions to produce optimal outcomes predicted based on the plurality of trading observations. Each of the plurality of prediction models is optimized to predict optimal outcomes for a respective one of a plurality of trading patterns by training the respective model through backtesting using an expanded training dataset comprising a plurality of simulated trading observations generated by a Monte Carlo algorithm based on a respective one of a plurality of Data Generating Processes (DGPs) derived from a respective one of a plurality of historical datasets comprising a plurality of past trading observations reflecting a respective one of the plurality of trading patterns.

Computing a respective probability score for mapping the received dataset to each of the plurality of DGPs.

Assigning a respective weight to each of the plurality of prediction models according to its respective probability score.

Computing aggregated trading instructions aggregating the trading instructions for investing a respective portion of an investment according to each of the plurality of prediction models based on its respective weight.

Outputting the aggregated trading instructions for use by one or more trading systems.

According to a second aspect of the present invention there is provided a system for computing optimized trading instructions, comprising one or more processors executing a code. The code comprising:

Code instructions to receive a dataset comprising a plurality of trading observations.

Code instructions to apply a plurality of prediction models to compute trading instructions to produce optimal outcomes predicted based on the plurality of trading observations. Each of the plurality of prediction models is optimized to predict optimal outcomes for a respective one of a plurality of trading patterns by training the respective model through backtesting using an expanded training dataset comprising a plurality of simulated trading observations generated by a Monte Carlo algorithm based on a respective one of a plurality of Data Generating Processes (DGPs) derived from a respective one of a plurality of historical datasets comprising a plurality of past trading observations reflecting a respective one of the plurality of trading patterns.

Code instructions to compute a respective probability score for mapping the received dataset to each of the plurality of DGPs.

Code instructions to assign a respective weight to each of the plurality of prediction models according to its respective probability score.

Code instructions to compute aggregated trading instructions aggregating the trading instructions of the prediction models for investing a respective portion of an investment according to each of the plurality of prediction models based on its respective weight.

Code instructions to output the aggregated trading instructions for use by one or more trading systems.

According to a third aspect of the present invention there is provided a computer program product comprising program instructions executable by a computer, which, when executed by the computer, cause the computer to perform a method according to first aspect.

According to a fourth aspect of the present invention there is provided a computer implemented method of creating an ensemble of prediction models optimized to predict optimal outcomes for a plurality of trading patterns, comprising:

Obtaining a plurality of historical datasets comprising a plurality of past trading observations. Each of the historical datasets comprises a plurality of past trading observations comprising a plurality of trading features observed during a past time period associated with respective outcomes. The plurality of trading features and the associated respective outcomes jointly reflect a respective one of a plurality of trading patterns.

Computing a respective Data Generating Processes (DGP) for each of the plurality of trading patterns based on a respective historical dataset.

Applying a Monte Carlo algorithm for generating, based on the respective DGP, a respective expanded training dataset comprising a plurality of simulated trading datasets.

Training each of a plurality of prediction models by backtesting using a respective expanded training dataset. Wherein a first subset of the simulated trading observations of the respective expanded training dataset is used for training the respective prediction model and a second subset of the simulated trading observations is used to test the respective prediction model.

Outputting the plurality of prediction models each trained using a respective expanded training dataset and thus optimized to predict optimal outcomes for a respective one of the plurality of trading patterns.

According to a fifth aspect of the present invention there is provided a system for creating an ensemble of prediction models optimized to predict optimal outcomes for a plurality of trading patterns, comprising one or more processors executing a code. The code comprising:

Code instructions to obtain a plurality of historical datasets comprising a plurality of past trading observations. Each of the historical datasets comprises a plurality of past trading observations comprising a plurality of trading features observed during a past time period associated with respective outcomes. The plurality of trading features and the associated respective outcomes jointly reflect a respective one of a plurality of trading patterns.

Code instructions to compute a respective Data Generating Processes (DGP) for each of the plurality of trading patterns based on a respective historical dataset.

Code instructions to apply a Monte Carlo algorithm for generating, based on the respective DGP, a respective expanded training dataset comprising a plurality of simulated trading datasets.

Code instructions to train each of a plurality of prediction models by backtesting using a respective expanded training dataset. Wherein a first subset of the simulated trading observations of the respective expanded training dataset is used for training the respective prediction model and a second subset of the simulated trading observations is used to test the respective prediction model.

Code instructions to output the plurality of prediction models each trained using a respective expanded training dataset and thus optimized to predict optimal outcomes for a respective one of the plurality of trading patterns.

According to a sixth aspect of the present invention there is provided a computer program product comprising program instructions executable by a computer, which, when executed by the computer, cause the computer to perform a method according to the fourth aspect.

In a further implementation form of the first, second, third, fourth, fifth and/or sixth aspects, the plurality of trading observations comprise a plurality of trading features observed during a certain recent time period associated with respective outcomes which jointly reflect a current trading pattern.

In a further implementation form of the first, second, third, fourth, fifth and/or sixth aspects, the plurality of simulated trading observations comprise a plurality of simulated trading features associated with respective simulated outcomes.

In an optional implementation form of the first, second, third, fourth, fifth and/or sixth aspects, the respective probability score for mapping the received dataset to each of the plurality of DGPs is computed based on a comparison between the respective outcomes extracted from the plurality of trading observations and the optimal outcomes computed by each of the plurality of prediction models.

In a further implementation form of the first, second, third, fourth, fifth and/or sixth aspects, the trading instructions are computed based on trading instructions computed by each of the plurality of prediction models based on a maximal outcome predicted in return to investing its respective portion of the investment.

In a further implementation form of the fourth, fifth and/or sixth aspects, each of the plurality of prediction models is trained using a first subset of the plurality of simulated trading observations generated based on the respective DGP and tested using a second subset of the plurality of simulated trading observations generated based on the respective DGP, the simulated outcomes of the second subset are not available to the plurality of prediction models.

In a further implementation form of the fourth, fifth and/or sixth aspects, a prediction performance of each of the plurality of prediction models is tested by comparing between the optimal outcome computed by the respective prediction model for the simulated values of the second subset and the simulated outcomes generated for the second subset by the Monte Carlo simulation algorithm.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
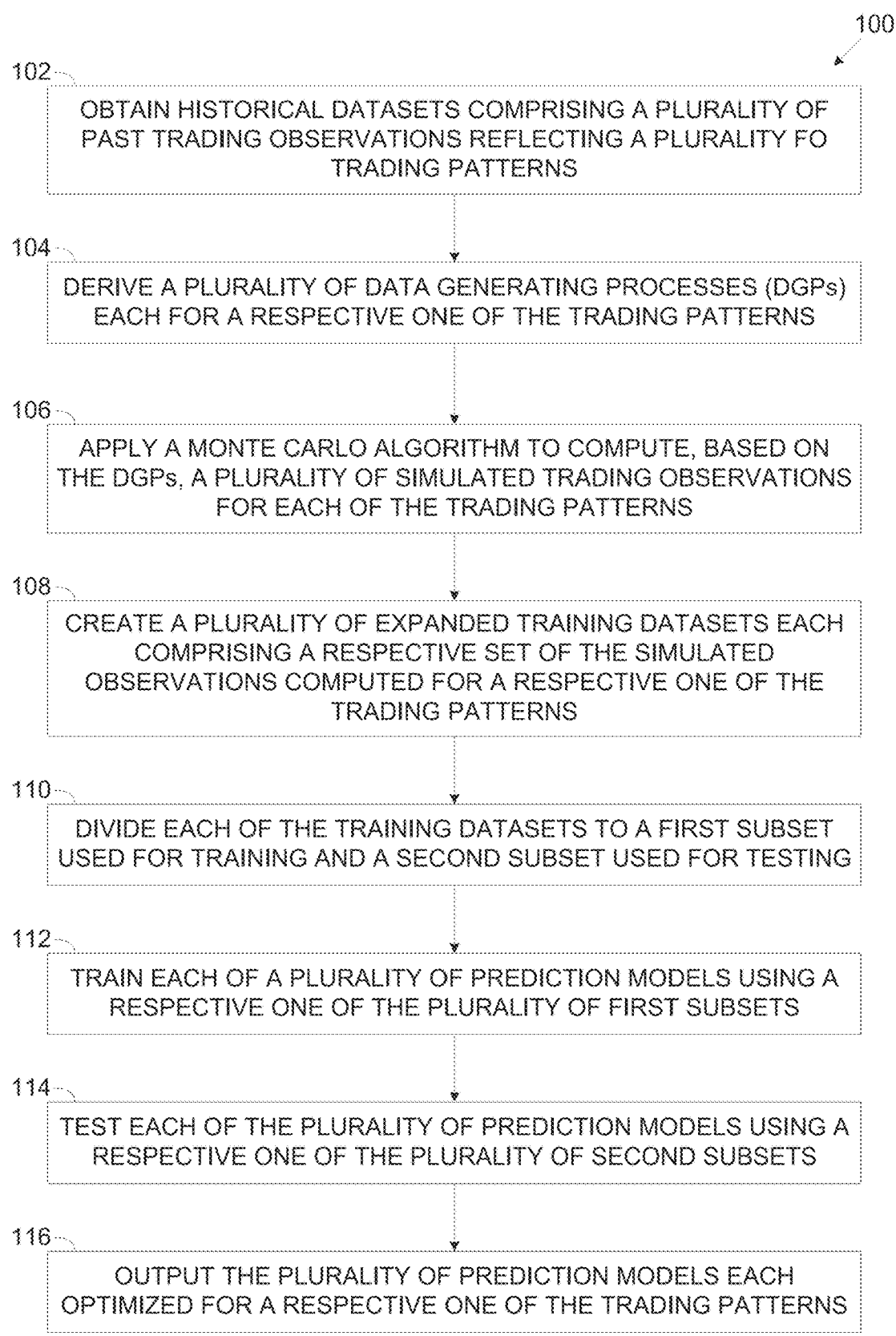
FIG. 1 is a flowchart of an exemplary process of creating a plurality of prediction models, according to some embodiments of the present invention.

The present invention, in some embodiments thereof, relates to training algorithms that produce positive investment performance and, more specifically, but not exclusively, to training a plurality of algorithms that produce optimal investment performance for a respective market pattern (regime).

Statistical models, specifically prediction models and/or algorithms, for example, Machine Learning (ML) models and algorithms such as, for example, neural networks, Support Vector Machines (SVM) and/or the like may be highly useful to predict mapping (i.e., classify, cluster, label, etc.) of outputs for given inputs after training (fitting) the statistical models on training data (sample data).

Trained (and tested) with extensive and diverse training (and testing data), the statistical models may achieve high estimation performance, for example, high accuracy, little errors (false positive, false negative, etc.) and/or the like in estimating the mapping of new (unseen) data samples based on the patterns and inferences derived from fitting on the training data.

However, training the prediction models with limited training data may present multiple concerns and pitfalls, for example, overfitting to the limited training data, poor testing due to little testing data and/or the like. This limitation is highly magnified when dealing with financial trading prediction models which may be trained and tested by backtesting using only a very limited historical datasets comprising past trading observations of the market(s) and performance, e.g., predictions, outcomes, profits, revenues and/or the like achieved by trading tools, models and/or algorithms applied in the past.

According to some embodiments of the present invention, there are provided methods and systems for expanding a training dataset used for backtesting, i.e. training and testing a prediction model, specifically a trading prediction model to prevent overfitting of the prediction model thus making it highly effective for predicting optimal outcomes for new (previously unseen) trading observations.

To this end, a Data-Generating Process (DGP), parametric and/or non-parametric, may be first derived from one or more historical datasets comprising a plurality of past trading observations captured at one or more trading market such as, for example, a stock exchange, a commodities exchange, and/or the like during a certain past time period.

The past trading observations may comprise a plurality of trading features observed in the trading market during the past time period and may further include one or more trading outcomes (returns, revenues) achieved by one or more trading strategies, algorithms, models and/or the like applied during the past time period. The trading features and the respective outcomes extracted from the past trading observations may express market and trading trends, conditions, circumstances, constraints and/or the like and may therefore jointly reflect a respective trading pattern characteristic to the market during the certain past time period.

A Monte Carlo algorithm may be applied to expand the historical dataset(s) by computing a plurality of simulated datasets based on the DGP where each of the simulated dataset simulates a potential future path and comprising a plurality of trading observations simulated accordingly.

The Monte Carlo algorithm may require a deeper knowledge of the DGP, derived from the statistical analysis of the trading observations or from theory (e.g., market microstructure, institutional processes, economic links, etc.). For instance, a certain economic theory may suggest that two variables are cointegrated, and empirical studies may indicate a range of values characterizing the cointegration vector. Accordingly, millions of years of data may be simulated, where the cointegration vector takes many different values within the estimated range. This approach may yield a much richer analysis than merely resampling observations from a finite, and likely unrepresentative, set of observations.

A training dataset may be created using the expanded simulated dataset which is essentially extremely larger than the original historical dataset and may reflect a plurality of possible past path (scenarios) rather than just one.

The prediction model may be then trained using the expanded training dataset. In particular, a first subset of the training dataset may be used to train the prediction model, i.e. to fir the prediction model on the training dataset while a second subset of the training dataset (which is not exposed to the prediction model) may be used for testing the prediction model.

After training the prediction model using the first subset, performance (e.g. accuracy, error count, etc.) of the prediction model may be evaluated by comparing between the optimal outcomes predicted by the precision model for the trading features extracted from the simulated trading observations of the second subset and the outcomes simulated by the Monte Carlo algorithm which are regarded as ground truth.

Using the Monte Carlo algorithm to expand the training dataset may present major benefits and advantages over existing backtesting methods.

Some of the existing backtesting methods, for example, Walk-Forward (WF) may assess the performance of an investment prediction model under the assumption that history repeats itself exactly. A first limitation of the WF is that past time series merely reflect one possible path produced by a DGP derived from past trading observations (samples). However, this is untrue due to the stochastic nature of the DGP which would have produced a different path for every replay of the past scenario. Since WF backtests are not representative of the past DGP, there is no reason to believe that they are representative of future DGP. A second limitation of WF is that the DGP is never stated, and thus in case the DGP changes, i.e. the current trading pattern, as reflected by current trading observations, changes it may be impossible to decommission the prediction model before it loses money, because the conditions that make the prediction model work are never understood in the first place.

Other existing backtesting methods, for example, Re-Sampling (RS) may address the first limitation of the WF method. The RS method may assess the performance of an investment prediction model under the assumption that future paths may be simulated through the resampling of past trading observations. The resampling may be deterministic (e.g., jackknife, cross-validation) or random (e.g., sub-sampling, bootstrap). Since the RS method may produce many different paths, where the historical path is just one possibility, RS allows considering more general scenarios consistent with the DGP. For instance, through a RS backtesting the distribution of the prediction model's Sharpe Ratio (RS) may be bootstrap, which is much more informative than the single-path Sharpe Ratio derived by the WF method. Whereas it may be trivial to overfit a WF backtest, it may be very difficult to overfit an RS backtest. However, as known in the art, resampling on a finite historical sample may not yield paths representative of the future thus limiting the RS to effectively predict optimal outcomes for current and/or future datasets.

In contrast, expanding the training dataset using the Monte Carlo algorithm may overcome both limitations of the existing methods since the Monte Carlo algorithm may create an enormous and arbitrarily large dataset comprising an extremely large number of trading observations (samples) which may reflect an endless number of simulated potential paths. This may serve to overcome the limitation in the availability of past financial information and past observations thus preventing overfitting of the prediction model. Moreover, the Monte Carlo may generate the simulated trading observations by randomly sampling the DGP thus significantly reducing noise at the input data, i.e. the trading observations which may have a major impact on the trained prediction model by degrading its performance. Another noise source which is overcome by the simulated training dataset is noise inherent to the signal itself, i.e. to the structure of the prediction model itself which may be significantly reduced using the expanded training dataset.

Moreover, the arbitrarily large expanded training dataset comprising long arrays of simulated observations may serve to avoid performance degradation effects resulting from Selection Bias Under Multiple Testing (SBuMT). Such SBuMT effects may greatly impact the existing backtesting methods which may need to control for SBuMT, for example, by tracking the number of trials in the WF method or by testing multiple paths in the RS method.

Another major limitation of existing backtesting methods may be the inability of a single strategic trading prediction model to encompass a wide and potentially all investment regimes expressed by respective trading patterns of one or more trading markets, exchanges and/or arenas. Different trading patterns, for example, trends, conditions, circumstances, constraints and/or the like may naturally require different logic and/or different implementation to predict optimal outcomes (revenues, return of investment, etc.).

According to some embodiments of the present invention, there are provided methods and systems for applying an ensemble of a plurality of trained prediction models to compute optimized trading instructions based on a certain dataset comprising a plurality of trading observations, for example, current trading observations, recent trading observations and/or the like.

A plurality of prediction models may be created and trained as described herein before using expanded training dataset generated by the Monte Carlo algorithm. Specifically, each of the prediction models nay be trained and tested using a respective expanded training dataset generated by the Monte Carlo algorithm based on a respective DGP derived from a respective historical dataset comprising a respective set of a plurality of trading observations reflecting a respective one of a plurality of trading patterns (regimes).

As such each of the prediction models may be optimized to predict optimal outcomes based on trading observations corresponding to its respective trading pattern.

The plurality of prediction models may be applied to compute trading instructions to produce the optimal outcomes based on the trading observations of the received dataset.

However, the relevance and/or efficiency of each of the prediction models for predicting the optimal outcomes based on the received trading observations may be weighted. To this end, a probability score may be computed for each prediction model to indicate a probability that the received trading observations are derived (drawn) from the respective DGP originally used to create the simulated dataset for training the respective prediction model. A high probability score may indicate high probability that the received trading observations are derived from the respective DGP while a low probability score may indicate low probability that the received trading observations are derived from the respective DGP.

Based on its computed probability score, a respective weight may be assigned to each of the prediction models. The weight assigned to each prediction model may be then used to allocate a respective portion of an investment (funds, capital, money, etc.) for investment according to the respective prediction model.

Aggregated trading instructions which may be computed by aggregating the trading instructions computed by the plurality of prediction models and distributing the investment portions according to the weights assigned to each of the prediction models.

The aggregated trading instructions may be highly optimized due to the distribution of investment funds over the plurality of prediction models and investing only a portion of the investment in each of the prediction model which is proportional to the estimated relevance and efficiency of each prediction model to the received dataset, i.e. to the reflected trading pattern (regime).

Using the ensemble of prediction models to compute the optimized trading instructions may significantly optimize the trading instructions to potentially yield an increased outcome (return of investment) since each of the prediction models may be highly optimized for a specific market regime and trading pattern. The existing methods may typically search, design and/or adapt a single prediction model to effectively operate across most if not all trading patterns. Such a concept may be naïve as it is unlikely to have a single prediction model which is trained and learned to adapt to a single structure applying the same weights and internal flows which will be efficient for all trading patterns and trading features. Using the ensemble, on the other hand, enables each of the prediction models to specialize to a limited number of trading patterns (market conditions, circumstances, attributes, etc.) and potentially a single trading pattern thus making it highly efficient for the respective treading pattern. Combining the plurality of prediction models to the ensemble and applying them according to the identified trading pattern may thus provide an effective solution for a wide range of trading patterns.

The ensemble may further allow investing over the large ensemble of prediction models which may transition smoothly from one trading pattern (regime) to another. Therefore, by distributing the investment over the plurality of prediction models the risk is significantly reduced while potentially optimizing and maximizing the outcomes (profit) by the weighted allocations.

Moreover, using the ensemble of prediction models to compute the optimized trading instructions may significantly reduce the risk since the overall investment may be divided over the plurality of prediction models rather than relying on a single or just a very few prediction model(s) associated with the most likely trading pattern (regime) which may highly risky and may potentially lead to major losses. The risk is thus allocated across the plurality of prediction models according to the distribution of their respective probability scores.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of creating a plurality of prediction models, according to some embodiments of the present invention.

An exemplary process 100 may be executed for creating and training, using backtesting, a plurality of prediction models, for example, an ML model such as for example, a neural network, an SVM and/or the like using a plurality of past observations reflecting a plurality of trading patterns (trading or market regimes). In particular, each of the prediction models is constructed and trained to optimize its predicted optimal outcomes, i.e. revenue, return of investment and/or the like for a respective one of the trading patterns (regime).

The training and testing of each of the prediction models is enhanced by expanding a respective historical dataset of past trading observations which is significantly limited to include a plurality of simulated trading observations used as a training dataset for the respective prediction model. Expanding the training dataset is done by applying a Monte Carlo algorithm to compute the plurality of simulated trading observations based on a DGP derived from the originally limited historical dataset of past trading observations.

Figure 2:
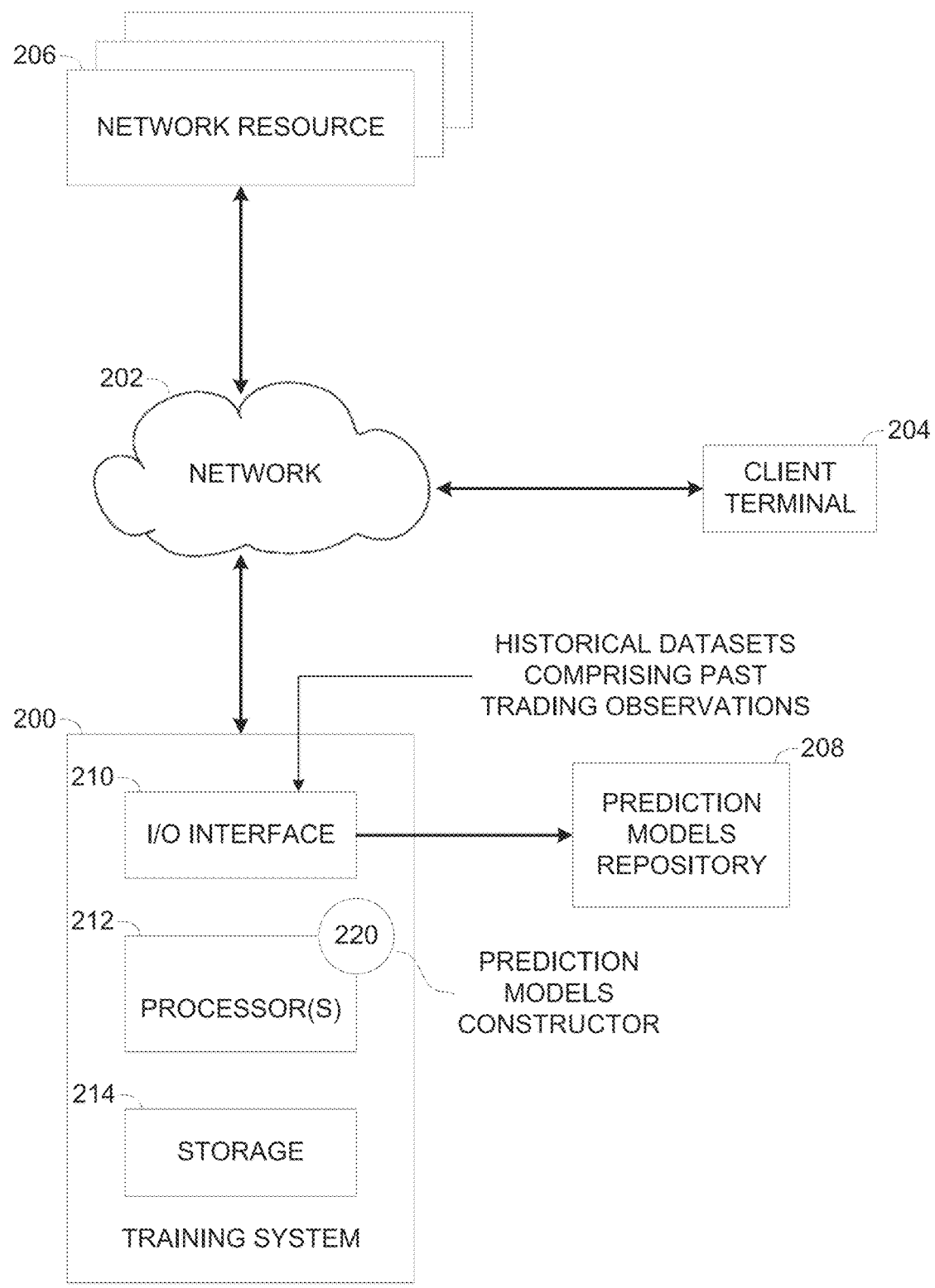
FIG. 2 is a schematic illustration of an exemplary system for creating a plurality of prediction models, according to some embodiments of the present invention.

Reference is also made to FIG. 2, which is a schematic illustration of an exemplary system for creating a plurality of prediction models, according to some embodiments of the present invention. An exemplary training system 200 may be used for executing the process 100 for creating and training the plurality of prediction models using the extended training datasets.

The training system 200, for example, a computer, a server, a computing node, a cluster of computing nodes and/or the like may include an Input/Output (I/O) interface 210 for connecting to one or more external devices, systems, services and/or the like, a processor(s) 212 for executing the process 100 and a storage 214 for storing data and/or code (program store).

The I/O interface 210 may include one or more wired and/or wireless network interfaces for connecting to a network 202 comprising one or more wired and/or wireless networks, for example, a Local Area Network (LAN), a Wide Area Network (WAN), a Metropolitan Area Network (MAN), a cellular network, the internet and/or the like. Using the network interface(s) the training system 200 may communicate, via the network 202, with one or more remote network resources 206, for example, a server, a computing node, a storage server, a networked database, a cloud service and/or the like. Through the network 202 the training system 200 may further communicate with one or more client terminals 204, for example, a computer, a server, a laptop, a mobile device and/or the like used by one or more users, for example, an operator, a researcher and/or the like.

The I/O interface 210 may further include one or more wired and/or wireless I/O interfaces, ports, interconnections and/or the like for connecting to one or more external devices, for example, a Universal Serial Bus (USB) interface, a serial interface, a Radio Frequency (RF) interface, a Bluetooth interface and/or the like. The I/O interface 210, the training system 200 may communicate with one or more external devices attached to the I/O interface(s), for example, an attachable mass storage device, an external media device and/or the like.

The training system 200, communicating with one or more of the external devices and/or network resources 206, may therefore receive, fetch, collect and/or otherwise obtain data and information required for training the prediction models, for example, one or more historical datasets comprising past trading observations, execution rules and/or the like.

The processor(s) 212, homogenous or heterogeneous, may include one or more processing nodes arranged for parallel processing, as clusters and/or as one or more multi core processor(s). The storage 214 may include one or more tangible, non-transitory persistent storage devices, for example, a hard drive, a Flash array and/or the like. The storage 214 may also include one or more volatile devices, for example, a Random Access Memory (RAM) component, a cache and/or the like. The storage 214 may further comprise one or more local and/or remote network storage resources, for example, a storage server, a Network Attached Storage (NAS), a network drive, a cloud storage service and/or the like accessible via the I/O interface 210.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212. The processor(s) 212 may further include, utilize and/or otherwise facilitate one or more hardware modules (elements), for example, a circuit, a component, an IC, an Application Specific Integrated Circuit (ASIC), a Field Programmable Gate Array (FPGA), a Digital Signals Processor (DSP), a Graphic Processing Units (GPU), an Artificial Intelligence (AI) accelerator and/or the like.

The processor(s) 212 may therefore execute one or more functional modules utilized by one or more software modules, one or more of the hardware modules and/or a combination thereof. For example, the processor(s) 212 may execute a prediction models constructor functional module 220 for creating and training the plurality of prediction models.

The trained prediction models may be stored in a prediction models repository 208 which may be local and/or remote. For example, the prediction models repository 208 may be implemented in the storage 214 of the training system 200. In another example, the prediction models repository 208 may be deployed in one or more of the network resources 206.

Optionally, the training system 200, specifically the prediction models constructor 220 are utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2) and/or the like.

One or more of the client terminals 204 may execute one or more applications, services and/or tools for communicating with the training system 200 and more specifically with the prediction models constructor 220 to enable one or more of the users to interact with the prediction models constructor 220. For example, one or more client terminals 204 may execute a web browser for communicating with the prediction models constructor 220 and presenting a User Interface (UI), specifically a Graphical UI (GUI) which may be used by the respective users to interact with the prediction models constructor 220. In another example, one or more client terminals 204 may execute a local agent which communicates with the prediction models constructor 220 and presents a GUI which may be used by the respective users to interact with the prediction models constructor 220.

As shown at 102, the process 100 starts with the prediction models constructor 220 receiving, fetching, collecting and/or otherwise obtaining a plurality of historical datasets. Each of the plurality of historical datasets comprises a plurality of past trading observations $\{\overline{X}, \overline{y}\}$ captured at one or more trading market such as, for example, a stock exchange, a commodities exchange, and/or the like during a respective one of a plurality of past time periods.

The prediction models constructor 220 may obtain the historical datasets from one or more of the network resources 206, for example, a repository, a database, a storage and/or the like and/or from one or more of the attachable external devices.

The past trading observations $\{\overline{X}, \overline{y}\}$ of each historic dataset may comprise a plurality of trading features $\overline{X}$ observed in the trading market during the respective past time period. The past trading observations of each historic dataset further include one or more trading outcomes $\overline{y}$ (returns, revenues) achieved by one or more trading strategies, algorithms, models and/or the like applied during the respective past time period defined by the observed trading features.

The trading features $\overline{X}$ and the respective outcomes $\overline{y}$ extracted from the past trading observations $\{\overline{X}, \overline{y}\}$ of each historical dataset may therefore jointly reflect a respective trading pattern characteristic to the market during the respective past time period. As such, a plurality of trading patterns characteristic to the plurality of past periods may be defined by the plurality of historical datasets obtained by the prediction models constructor 220.

A shown at 104, the prediction models constructor 220 may derive a plurality of DGPs, each a respective one of the historical datasets. Specifically, the prediction models constructor 220 may derive each of the plurality of DGPs from the trading features $\overline{X}$ and trading outcomes $\overline{y}$ extracted from the trading observation included in the respective set of the plurality of past trading observations$\{\overline{X}, \overline{y}\}$. Each such DGP may be therefore associated with a respective one of the trading patterns reflected by the respective historical dataset comprising the past trading observations$\{\overline{X}, \overline{y}\}$.

Each DGP computed by the prediction models constructor 220 may be parametric or non-parametric. An instance of a parametric DGP is a regime-switching time series model as known in the art, where trading observations (samples) are drawn from alternative processes, n=1, . . . , N, and where the probability $p_{t,n}$ of drawing a trading observation from process n at time t is a function of the processes from which previous trading observations were drawn (a Markov chain).

The parameters of a parametric DGP model may be derived from theoretical considerations, or they may be estimated based on the historical trading observations $\{\overline{X}, \overline{y}\}$, where $\overline{X}$ is the matrix of trading features useful to predict the array of target outcomes $\overline{y}$. One or more expectation-maximization algorithms may be used to estimate the probability of transitioning from one process to another at time t, the transition probability matrix. This parametric approach may enable matching statistical properties of the dataset of trading observations which may later be replicated in an unobserved dataset as known in the art.

In some scenarios, the parametric DGP may be more complex than a finite set of algebraic functions may be able to replicate. In such case, non-parametric DGPs may be used such as, for example, variational autoencoders, self-organizing maps, generative adversarial networks and/or the like. These methods may be understood as non-parametric, non-linear estimators of latent variables, similar to a non-linear Principal Component Analysis (PCA).

For example, an autoencoder is a neural network which is trained ad learned how to represent high-dimensional observations in a low-dimensional space. In another example, variational autoencoders have an additional property which makes their latent spaces continuous. This may allow for successful random sampling and interpolation and, in turn, their use as a generative model. Once a variational autoencoder has learned the fundamental structure of the trading observations data, it may generate new trading observations that resemble the statistical properties of the original trading observation (sample), within a given dispersion (hence the notion of "variational").

A self-organizing map differs from autoencoders in that it may apply competitive learning, rather than error-correction, and use a neighborhood function to preserve the topological properties of the input space. Generative adversarial networks may train two competing neural networks, where one network (called a generator) may be tasked with generating simulated trading observations from a distribution function, and the other network (called a discriminator) may be tasked with predicting the probability that the simulated trading observations are false given the true observed data, i.e. the true trading observations. The two neural networks compete with each other, until they converge to an equilibrium. The original trading observation (sample) from which the non-parametric DGP is derived must be representative enough to learn the general characteristics of the DGP, otherwise a parametric DGP may be preferable.

As shown at 106, the prediction models constructor 220 may apply a Monte Carlo algorithm to expand each of the historical datasets by computing a plurality of simulated trading observations based on the respective DGP.

For each historical dataset, the Monte Carlo algorithm may randomly sample and/or compute new unobserved, i.e. simulated dataset from an estimated population, specifically from the respective DGP created for the respective historical dataset, rather than from an observed dataset (like a bootstrap would do).

Each simulated dataset generated by the Monte Carlo algorithm based on a respective one of the DGPs may thus comprise a plurality of simulated trading observations.

The prediction models constructor 220 may therefore apply the Monte Carlo algorithm to each of the DGPs, which are each derived from the respective one of the historical datasets, to extend the respective historical dataset by generating a plurality of additional simulated trading observations.

In particular, the Monte Carol algorithm may generate a simulated dataset composed of a matrix of trading features (X) and an array of labels (y), for example, outcomes (returns, revenues). The simulated dataset may be arbitrarily large, potentially comprising millions of simulated trading observations.

As shown at 108, the prediction models constructor 220 may create a plurality of expanded training datasets. The prediction models constructor 220 may create each training dataset from a respective expanded dataset comprising a respective set of the plurality of simulated trading observations (samples) generated based on a respective one of the DGPs. As such each of the expanded training dataset corresponds to a respective DGP.

As shown at 110, the prediction models constructor 220 may divide each of the expanded training datasets, i.e. each simulated dataset comprising a respective set of a plurality of simulated trading observations $\{X, y\}$ into two subsets each comprising a respective group of pairs of the trading features and their associated outcomes. A first subset comprising features/outcomes pairs $\{X_1, y_1\}$ may be used for training the prediction models while a second subset comprising features/outcomes pairs $\{X_2, y_2\}$ may be used for testing the prediction models.

The prediction models constructor 220 may therefore create a plurality of first subsets and a plurality od second subsets where each pair of first and second subsets is used for training and testing a respective one of the plurality of prediction models.

As shown at 112, the prediction models constructor 220 may train the plurality of prediction models using the plurality of training datasets such that each instance of the prediction model may be trained with a respective training dataset, i.e. with a respective simulated dataset$\{X, y\}$, specifically with a respective first subset $\{X_1, y_1\}$ of the respective simulated dataset $\{X, y\}$.

In particular, each prediction models may be trained by backtesting, as known in the art for training trading and/or financial models, using the respective expanded training dataset.

It should be noted that while the description refers to a plurality of prediction models, the plurality of prediction models may be actually utilized by a relatively small set of prediction models having a common construction or even a single prediction model. However, each instance of the prediction model(s) may be trained using a respective expanded training dataset and hence fitted for a different trading pattern.

In the general case, the prediction models trained using the first subset $\{X_1, y_1\}$ may be optimized and evaluated using one or more techniques as known in the art, for example, Receiver Operating Characteristics (ROC), Area Under the ROC Curve (AUC) and/or the like.

In case of the trading predictions models the optimization and evaluation measures may be applied according to one or more performance metrics and/or scores, for example, a Sharp Ratio (SR), specifically an annualized Sharpe Ratio which has become de facto the most popular trading investment performance metric. The trading prediction models algorithm may define one or more trading rules, for example, a filter, a condition and/or the like which, applied on $X_1$, may trigger one or more trading actions, for example, buy a trading instrument, hold a position until a predefined exit condition is detected and/or the like. The performance of each of the trading predictions models may be then evaluated based on the quality of the triggered actions according to one or more of the performance metrics, for example, the annualized Sharpe Ratio.

As shown at 114, the prediction models constructor 220 may test each of the prediction models using a respective simulated dataset $\{X, y\}$, specifically a respective second subset $\{X_2, y_2\}$ of the respective simulated dataset $\{X, y\}$.

The prediction models constructor 220 may apply each of the trained prediction models to predict an optimal outcome $\hat{y}_2$ for the trading features $X_2$ defined by the respective second subset without exposing the respective prediction model to the simulated outcomes $y_2$ of the respective second subset. Denying the prediction models access to the simulated outcomes $y_2$ may ensure that the prediction model is adjusted, adapted and/or fitted to improve its performance for the trading features $X_2$.

The optimal outcome $\hat{y}_2$ may be achieved by issuing one or more trading instructions and/or recommendations $\hat{z}_2$ depending on the type of the trained prediction model.

The prediction models constructor 220 may then evaluate the performance of each of the prediction models by comparing between the optimal outcome $\hat{y}_2$ predicted by the respective prediction model for the trading features $X_2$ defined by its respective second subset and the actual simulated outcomes $y_2$ of the respective second subset which may be regarded as ground truth.

However, the fact that the prediction models are not provided with information relating to their respective DGPs and the respective actual outcomes $y_2$ may not preclude possibility of backtest overfitting, in the form of Selection Bias Under Multiple Testing (SBuMT). In order to avoid SBuMT the prediction models constructor 220 may configure, adapt and/or operate the Monte Carlo algorithm to produce arbitrarily large expanded training dataset comprising long $y_2$ arrays. This is in contrast to existing backtesting methods which may need to control for SBuMT, for example, by tracking the number of trials in the Walk Forward (WF) method or by testing multiple paths in the Re-Sampling (RS) method.

As shown at 116, the prediction models constructor 220 may output the ensemble of the plurality of trained prediction models which are each optimized for a respective one of the plurality of trading patterns reflected by a respective set of past trading observations $\{\overline{X}, \overline{y}\}$ extracted from a respective one of the plurality of initially received historical datasets.

Specifically, the prediction models constructor 220 may output each of the prediction models which may be designated S in association with its respective expanded dataset {X, y} to indicate each prediction model S is optimized for a the respective dataset {X, y}. As such each prediction model may be output in the form ({X, y}, S).

The prediction models constructor 220 may output the plurality of trained prediction models using one or more methods, techniques and/or implementations. For example, the prediction models constructor 220 may store the plurality of trained prediction models in the prediction models repository 208 which may be accessed by one or more trading systems configured to use the trained prediction models for generating instructions for investing funds and capital in current and/or future times according to one or more of prediction models. In another example, the prediction models constructor 220 may transmit the trained prediction models to one or more of the trading systems.

Figure 3:
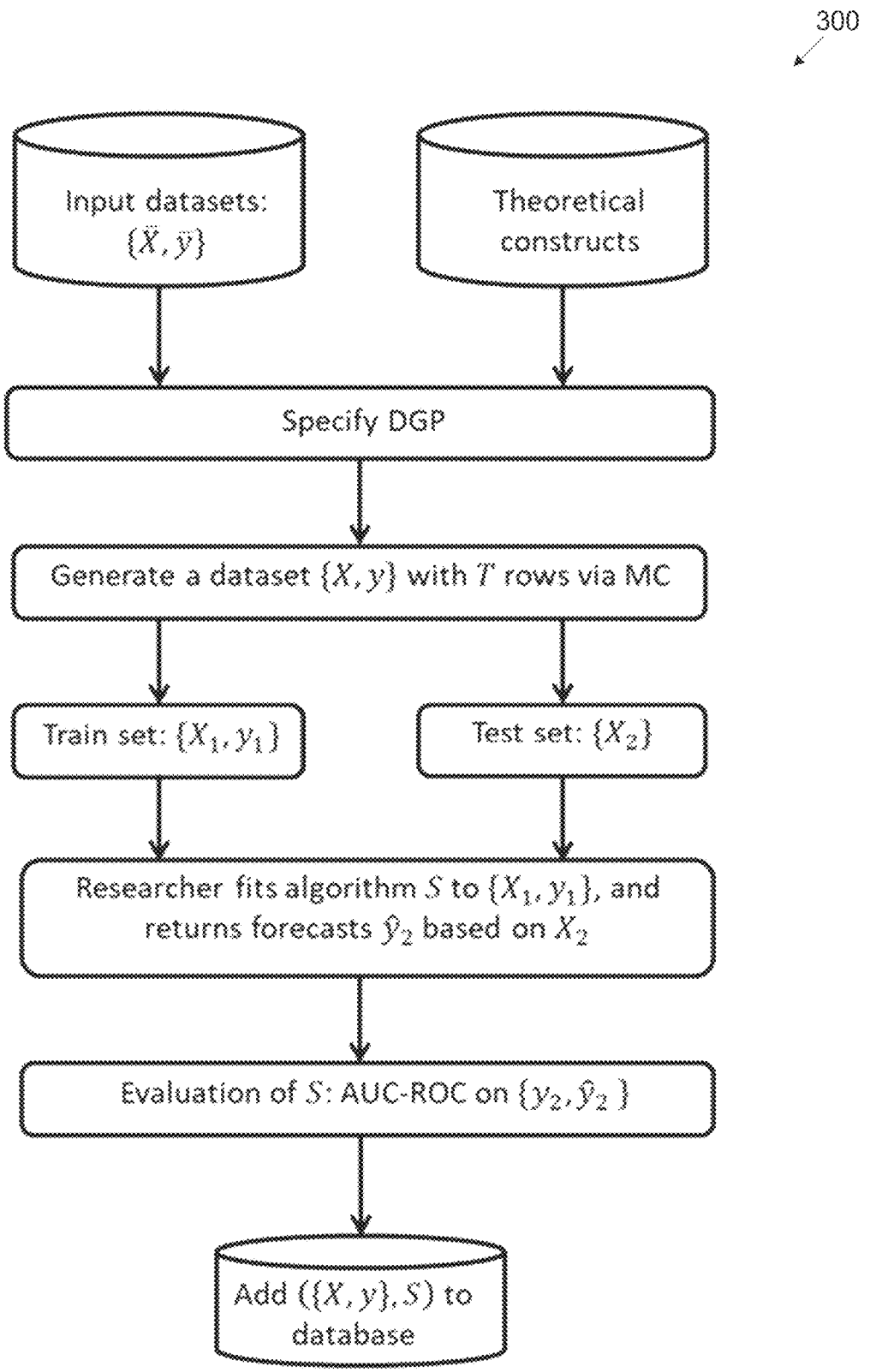
FIG. 3 is a schematic illustration of an exemplary sequence for creating each of a plurality of prediction models, according to some embodiments of the present invention.

Reference is now made to FIG. 3, which is a schematic illustration of an exemplary sequence for creating each of a plurality of prediction models, according to some embodiments of the present invention. An exemplary sequence 300 may be followed by a prediction models constructor such as the prediction models constructor 220 executing a process such as the process 100 to create an ensemble comprising a plurality of trained prediction models. Specifically, the sequence 300 describes the process 100 executed for creating and training a single prediction model S using a respective expanded dataset comprising a respective set of a plurality of simulate trading observations {X, y} derived from respective set of past training observations {$\overline{X}$, $\overline{y}$}. However, the sequence 300 may be repeated to create a plurality of prediction model S each trained, fitted and thus optimized for a respective expanded dataset {X, y} and hence optimized for a respective one of the plurality of trading patterns reflected by a respective historical dataset comparing a respective set of past training observations {$\overline{X}$, $\overline{y}$}.

As seen in sequence 300, the prediction models constructor 220 may first obtain the historic dataset comprising the past training observations {$\overline{X}$, $\overline{y}$}. The prediction models constructor 220 may then fit the dataset {$\overline{X}$, $\overline{y}$} through a parametric and/or non-parametric methods to derive a DGP. Optionally, the prediction models constructor 220 adapts, adjusts, configures and/or updates the DGP according to one or more stylized facts derived from theory.

The prediction models constructor 220 may then apply the Monte Carlo algorithm to generate, using the estimated DGP, a synthetic dataset {X, y} (expanded simulated dataset) comprising the plurality of simulated trading observations. The synthetic dataset {X, y} may be split into a first training set {$X_1$, $y_1$} and a second testing set {$X_2$, $y_2$}. The first set {$X_1$, $y_1$} may be used for training and fitting the prediction model by training the prediction model to predict $y_1$ using $X_1$. The second testing set {$X_2$, $y_2$}, where $y_2$ is not exposed to the prediction model during the training phase, may be used for testing the prediction model by applying the prediction model to predict $\hat{y}_2$ for $X_2$.

The prediction models constructor 220 may evaluate the performance of the trained prediction model by comparing between the predicted outcome $\hat{y}_2$ and $y_2$ through calculation of one or more performance scores according to one or more of the performance metrics, for example, the AUC-ROC and/or the like.

Finally, the prediction models constructor 220 may output the prediction model ({X, y}, S) in case the performance score exceeds a certain predefined threshold.

According to some embodiments of the present invention, an ensemble of trained (trading) prediction models may be applied to predict an optimal outcome (revenues, return of investment, etc.) for a given dataset of trading observations, for example, a dataset of current trading observations captured during a certain recent time period. In particular, each of the plurality of prediction models may be optimized to predict optimal outcomes for a respective one of a plurality of trading patterns.

Each of the prediction model is trained using a respective training dataset derived from a respective historical dataset comprising a plurality of past trading observations (samples). Moreover, the respective training dataset used to train each prediction model is expanded to include a plurality of simulated trading observations (samples) generated by the Monte Carlo algorithm based on the respective DGP derived from the past trading observations of the respective historical dataset.

Figure 4:
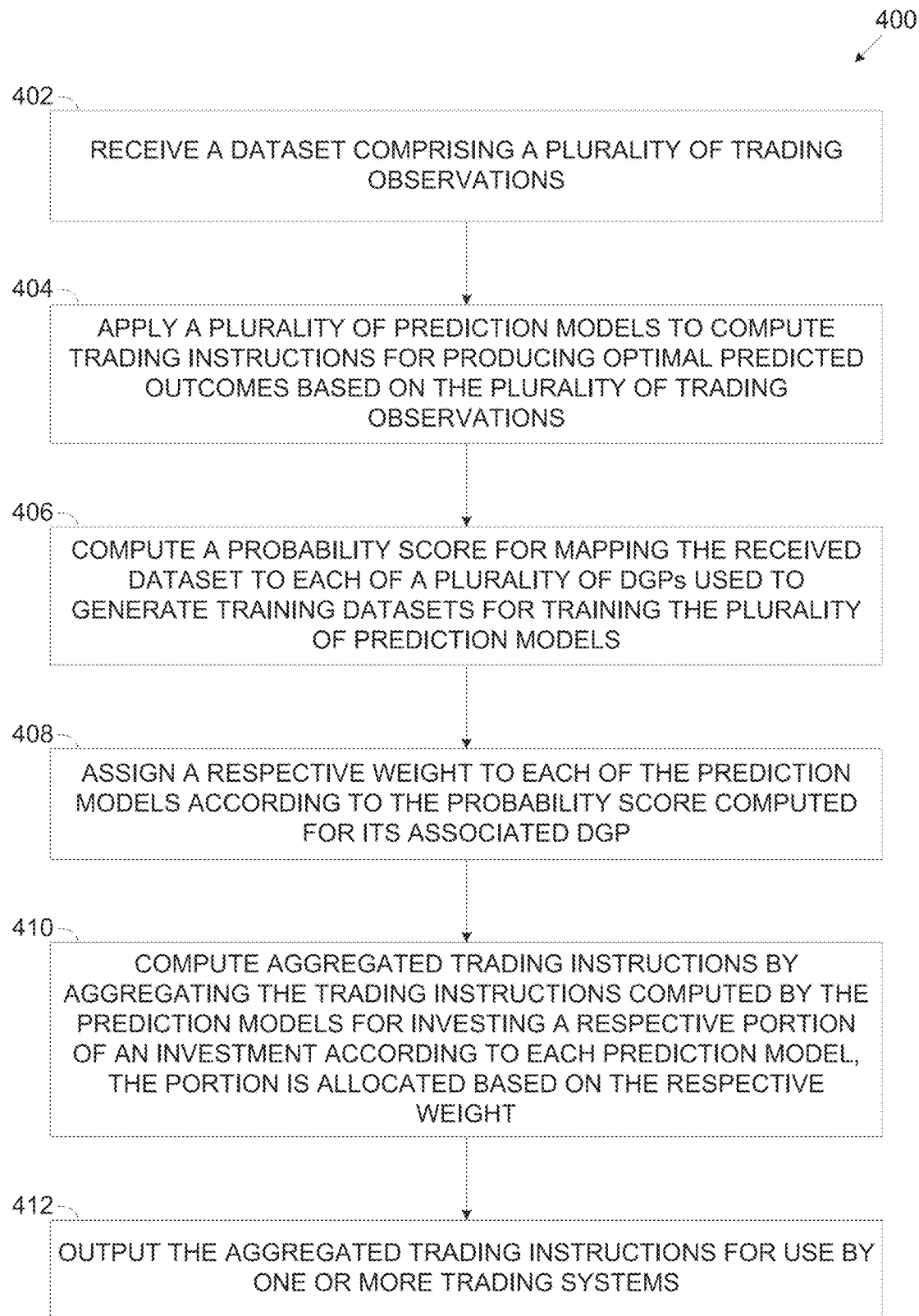
FIG. 4 is a flowchart of an exemplary process of computing trading instructions based on a certain dataset of trading observations using a plurality of prediction models each optimized for a respective trading pattern, according to some embodiments of the present invention.
Figure 5:
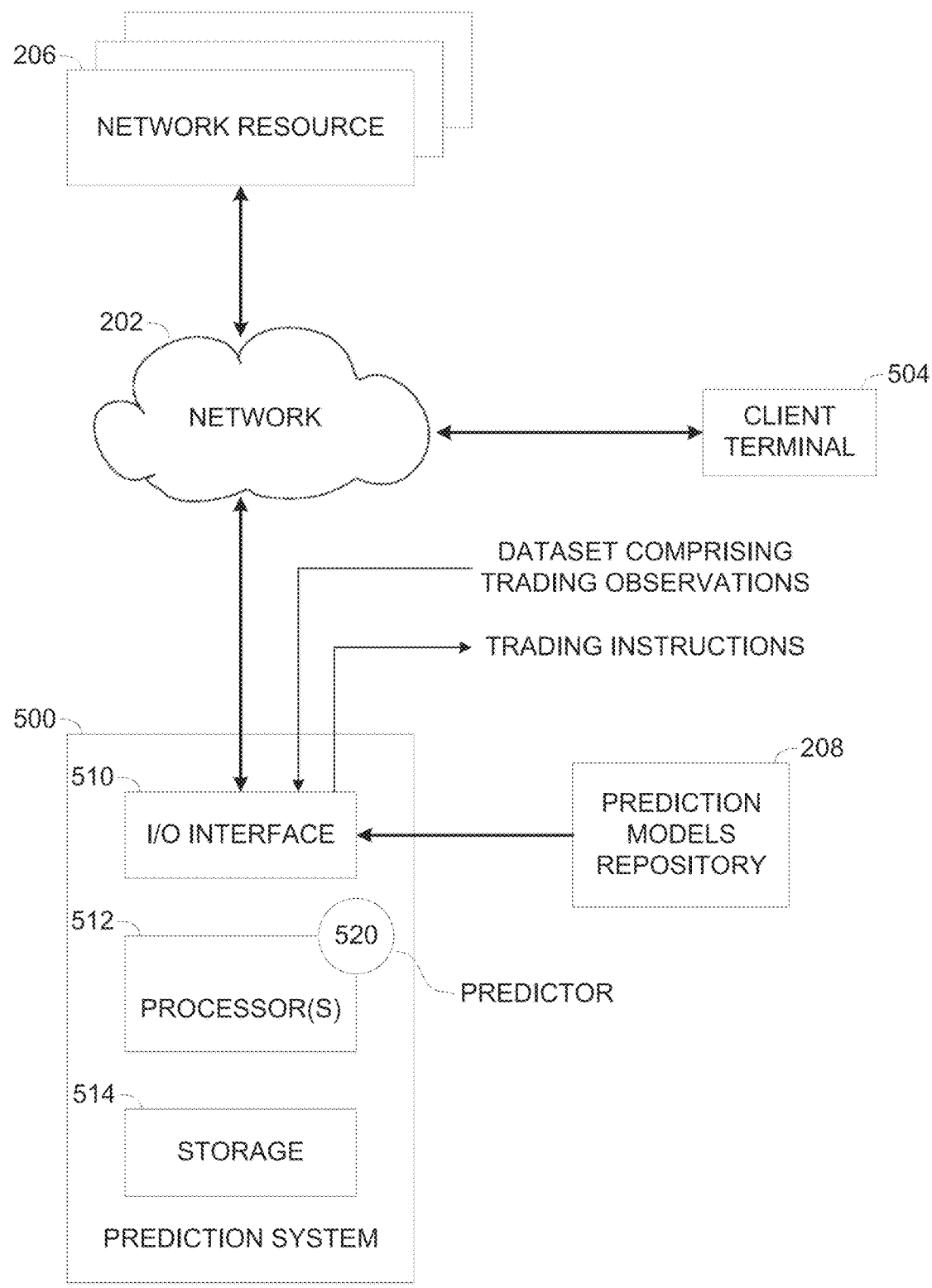
FIG. 5 is a schematic illustration of an exemplary system for computing trading instructions based on a certain dataset of trading observations using a plurality of prediction models each optimized for a respective trading pattern, according to some embodiments of the present invention.

Reference is now made to FIG. 4, which is a flowchart of an exemplary process of computing trading instructions based on a certain dataset of trading observations using a plurality of prediction models each optimized for a respective trading pattern, according to some embodiments of the present invention. Reference is also made to FIG. 5, which is a schematic illustration of an exemplary system for computing trading instructions based on a certain dataset of trading observations using a plurality of prediction models each optimized for a respective trading pattern, according to some embodiments of the present invention.

An exemplary process 400 may be executed by an exemplary prediction system 400 for commuting optimized trading instructions by applying an ensemble of a plurality of prediction models to a certain received dataset comprising a plurality of trading observations, for example, current trading observations, recent trading observations and/or the like. Each of the prediction models may be optimized to predict optimal outcomes for a respective one of a plurality of trading pattern and the prediction system 400 may generate the trading instructions according to a match between the received dataset and the datasets used to train and fir each of the prediction models.

The prediction system 400, for example, a computer, a server, a computing node, a cluster of computing nodes and/or the like may include an I/O interface 510 such as the I/O interface 210 for connecting to one or more external devices, systems, services and/or the like, a processor(s) 512 such as the processor(s) 212 for executing the process 400 and a storage 514 such as the storage 314 for storing data and/or code (program store).

Through the I/O interface 510, the prediction system 400 may receive and/or output data, for example, obtain one or more datasets of trading observations, obtain the ensemble of prediction models, output trading instructions and/or the like. Via the I/O interface 510, the prediction system 400 may further connect to a network such as the network 202 to communicate with one or more network resources such as the network resources 206 which may further include one more trading systems automated and/or manually operated.

The prediction system 400, communicating with one or more of the external devices and/or network resources 206, may therefore receive, fetch, collect and/or otherwise obtain data and information required for training the prediction models. For example, the prediction system 400 may access a prediction models repository such as the prediction models repository 208 to fetch, receive, collect and/or otherwise obtain the plurality of prediction models. In another example, the prediction system 400 may output the trading instructions, for example, transmit the trading instructions to one or more of the network resources 206, for example, to one or more of the trading systems.

The prediction system 400 may further communicate with one or more client terminals such as the client terminal 204 used by one or more users, for example, an operator, a trader and/or the like to receive instructions, trading rules and/or the like and/or to output (transmit) recommended optimized trading instructions and/or other data.

The processor(s) 512 may be constructed as the processor(s) 212 and similarly the storage 514 may be constructed as the storage 214.

The processor(s) 512 may therefore execute one or more functional modules utilized by one or more software modules, one or more of the hardware modules and/or a combination thereof. For example, the processor(s) 512 may execute a predictor functional module 520 for computing optimized trading instructions.

Optionally, the prediction system 400, specifically the predictor 520 are utilized by one or more cloud computing services, platforms and/or infrastructures such as, for example, IaaS, PaaS, SaaS and/or the like provided by one or more vendors, for example, Google Cloud, Microsoft Azure, AWS and EC2 and/or the like.

As shown at 402, the process 400 starts with the predictor 520 receiving, for example, fetching, collecting and/or otherwise obtaining a dataset comprising a plurality of trading observations captured at one or more of the trading markets during a certain time period, for example, a current time period, a most recent time period and/or the like.

To follow the previously presented conventions, the received dataset, specifically the trading observations included in the received dataset may be designated $\{X_3, y_3\}$ where $X_3$ refers to the observed trading features extracted from the trading observations and $y_3$ refers to the outcomes (returns, revenues, etc.) associated with the observed trading features.

As shown at 404, the predictor 520 may apply a plurality of prediction models S, created and trained as described in the process 100, to compute trading instructions to produce an optimal outcome (revenue, return of investment) predicted based on the trading observation (samples) of the received dataset.

As shown at 406, the predictor 520 may compute a respective probability score p for mapping the received dataset $\{X_3, y_3\}$ to each of the plurality of DGPs generated for the plurality of trading patterns as described in the process 100. In other words, the respective probability score p may indicate the probability that the received dataset $\{X_3, y_3\}$ may be derived (drawn) from a respective one of the DGPs generated based on a respective dataset $\{X, y\}$. Intuitively, the probability score p may express how similar the current trading pattern (regime) is to each of the trading patterns (regimes) associated with each of the prediction models.

The predictor 520 may compute the probability score p indicating the probability of mapping the received dataset $\{X_3, y_3\}$ to each pair of a respective prediction model and a respective simulated dataset $(\{X, y\}, S)$ using one or more methods, techniques and/or algorithms, for example, a Kolmogorov-Smirnov test, a Wasserstein distance, a Kullback-Leibler divergence between $\{X_3, y_3\}$ and $\{X, y\}$ and/or the like.

Optionally, the predictor 520 may compute the respective probability score p for mapping the received dataset $\{X_3, y_3\}$ to each of the plurality of DGPs based on a comparison between the respective outcomes $y_3$ extracted from the plurality of trading observations $\{X_3, y_3\}$ and the optimal outcomes y computed by each of the plurality of prediction models.

In another embodiment, rather than estimating the probability score p that market security's observations are drawn from a DGP (as described herein before, a synthetic security may be created whose observations follow a user-defined DGP with a given probability level.

As shown at 408, the predictor 520 may assign a respective weight to each of the prediction models according to the respective probability score computed for the respective prediction model. Each weight is therefore proportional to the respective probability score such that for high probability scores, the respective weights may be large while for lower probability scores, the respective weights may be small.

As shown at 410, the predictor 520 may aggregate the trading instructions computed by each of the plurality of prediction models to produce aggregated trading instructions.

Specifically, the predictor 520 may allocate a respective portion of an investment (funds, capital, financial means, etc.) for investing the respective portion according to each of the plurality of prediction models. The predictor 520 may allocate the respective portion to each of the prediction models based on the respective weight assigned to the respective prediction model. This means that the portion allocated for investment according to each of the prediction models is proportional to the weight assigned to the respective prediction model. Such, the predictor 520 may allocate larger portions of the investment for investment according to prediction models assigned with higher weights while allocating smaller portions of the investment for investment according to prediction models assigned with smaller weights.

The predictor 520 may compute the aggregated trading instructions to instruct investing the respective portion of the investment according to the trading instructions computed by the respective prediction model. This means that the aggregated trading instructions may be computed to produce the optimal outcome predicted by the plurality of prediction models based on the received trading observations where the investment is distributed over the plurality of prediction models according to their allocated portions of investment.

This approach may mitigate risk since the overall investment may be divided over the plurality of prediction models rather than relying on a single or just a very few prediction model(s) associated with the most likely trading pattern (regime) which may highly risky and may potentially lead to major losses. The risk is thus allocated across the plurality of prediction models according to the distribution of their respective probability scores $\{p\}$. This approach allows investments over the large ensemble of prediction models which may transition smoothly from one trading pattern (regime) to another. Therefore, by distributing the investment over the plurality of prediction models the risk is significantly reduced while potentially optimizing and maximizing the outcomes (profit) by the weighted allocations.

For example, assuming the ensemble includes five prediction models each optimized to predict optimal outcomes for a respective one of the trading pattern. Further assuming for the first prediction model the computed probability score is 0.8, for the second prediction model the computed probability score is 0.5, for the third prediction model the computed probability score is 0.2, for the fourth prediction model the computed probability score is 0.2 and for the fifth prediction model the computed probability score is 0.3. In such case, the predictor 520 may assign a first weight 0.4 to the first prediction model, a second weight 0.25 to the second prediction model, a third weight 0.1 to the third and fourth prediction models and a fourth weight 0.15 to the fifth prediction model. The predictor 520 may therefore allocate a portion of 0.4 of the overall investment funds for investment according to the first prediction model, a portion of 0.25 of the overall investment funds for investment according to the second prediction model, a portion of 0.1 of the overall investment funds for investment according to each of the third and fourth prediction models and a portion of 0.15 of the overall investment funds for investment according to the fifth prediction model. The predictor 520 may compute the aggregated trading instructions accordingly to include the trading instructions computed by the respective prediction models with the investment portions distribution as set according to their assigned weights.

As shown at 414, the predictor 520 may output the trading instructions, specifically the aggregated trading instructions which may be used by one or more of the trading systems 206 which may be automatic, semi-automatic and/or manual and/or to one or more of the client terminals 204. For example, the predictor 520 may transmit the trading instructions to the trading system(s) 206 and/or to the client terminal(s) 204 via the network 202.

Figure 6:
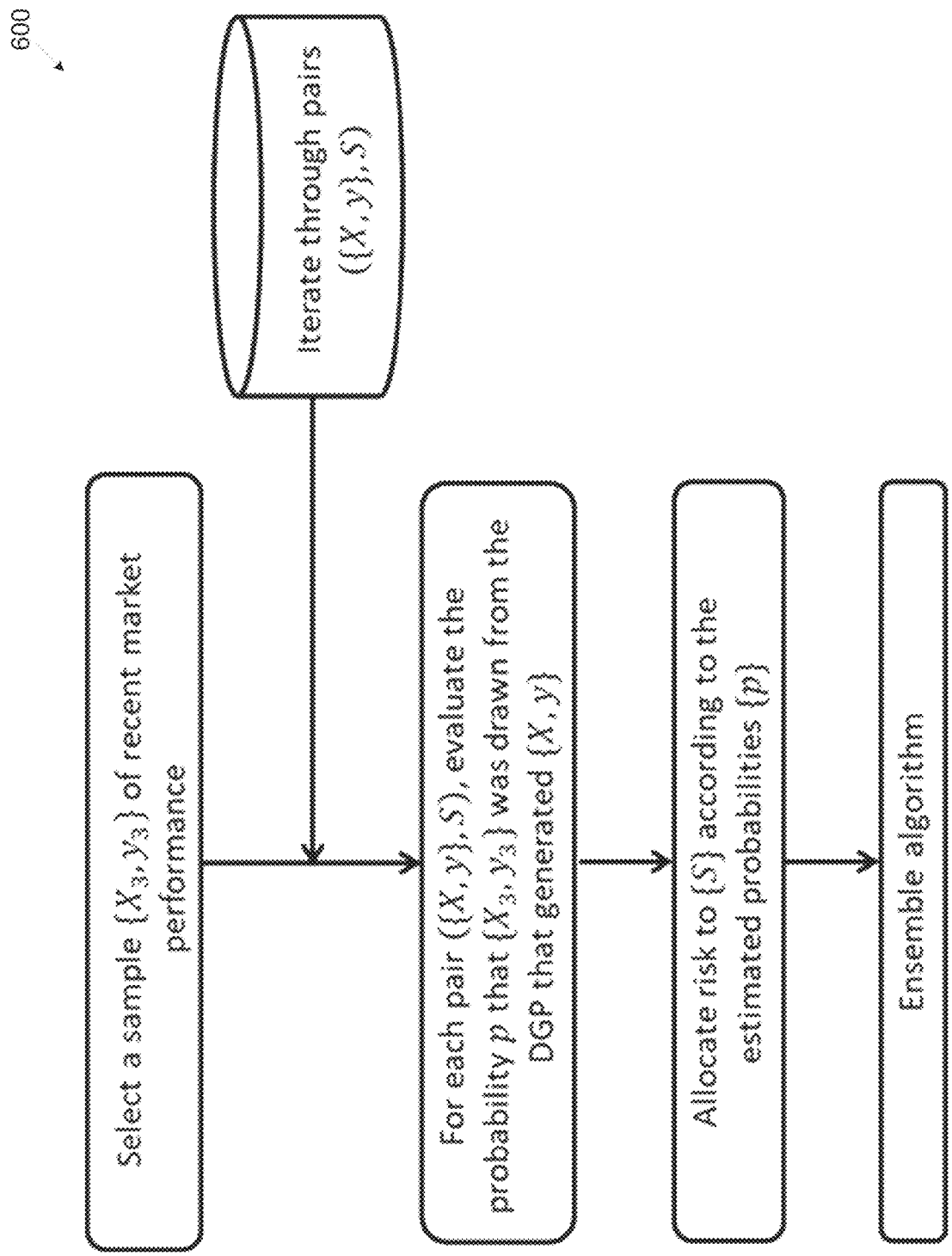
FIG. 6 is a schematic illustration of an exemplary sequence for computing trading instructions based on a certain dataset of trading observations using a plurality of prediction models each optimized for a respective trading pattern, according to some embodiments of the present invention.

Reference is now made to FIG. 6, which is a schematic illustration of an exemplary sequence for computing trading instructions based on a certain dataset of trading observations using a plurality of prediction models each optimized for a respective trading pattern, according to some embodiments of the present invention.

An exemplary sequence 600 may be followed by a predictor such as the predictor 520 executing a process such as the process 400 to compute optimized trading instructions using an ensemble of a plurality of trained prediction models each optimized for a receptive one of a plurality of trading patterns (regimes).

FIG. 3 illustrates the deployment stage, described in section 4. First, a memory bank hosts a database of algorithms developed during the research stage. Second, a multiplicity of processors runs each algorithm in paper trading, and computes the performance of each algorithm. Third, a multiplicity of processors evaluates the probability that paper trading performance from each algorithm is drawn from the same DGP that generated the algorithm's $\{X_1, y_1\}$. Fourth, a processor allocates risk to each algorithm as a function of the estimated probability. As seen in sequence 300, the predictor 520 may first apply the ensemble of prediction models each designated by respective ($\{X, y\}$, S) to compute trading instructions for producing optimal outcomes predict based on the received trading observations (samples) $\{X_3, y_3\}$. The predictor 520 may then compute the probability score p indicating a probability of mapping the received dataset $\{X_3, y_3\}$ to each pair of prediction model and simulated dataset ($\{X, y\}$, S). The predictor 520 may then assign the respective weight to each of the prediction models according to the respective probability score and may further allocate a portion of the investment for investment according to the respective prediction model which may be regarded as a risk allocation as described herein before.

Finally, the predictor 520 may compute the aggregated trading instructions which aggregate the trading instructions computed by the plurality of prediction models adjusted by the portion of investment allocated for each of the prediction models. This means that the predictor 520 may compute an ensemble portfolio which results from the weighted average of the individual prediction models, where the weightings reflect the risk allocations.

Following is an exemplary practical deployment of the processes 100 and 400 applied for an investment algorithm.

Assuming that based on some empirical trading observation, it is estimated that one or more financial instrument may undergo occasional mean-reverting regimes, i.e. transition between different trading patterns. The mean-reverting property may be modelled through a variety of DGPs. One such DGP is a first-order autoregressive process, known as AR(1), which may be described by equation 1 below.

$$p_t = \alpha + \beta p_{t-1} + \sigma \varepsilon_t \qquad \text{Equation 1:}$$

where $p_t$ is the log-price of a security at observation t, and $\varepsilon_t$ is the model's error at observation t.

This DGP is characterized by three parameters, $\{\alpha, \beta, \sigma\}$, which may be estimated via ordinary least squares as known in the art. When $|\beta|<1$, this process reaches an equilibrium (unconditional mean) $E_t[p_\infty]$ as expressed in equation 2 below.

$$E_t[p_\infty] = \frac{\alpha}{1-\beta} \qquad \text{Equation 2}$$

with unconditional variance $$V_t[p_\infty] = \frac{\sigma^2}{1-\beta^2}$$

The DGP may be fitted to past trading observation of historical datasets that are representative of the current market trading pattern (regime), for the purpose of generating a long dataset. For instance, the AR(1) process may be applied, for example, to S&P 500 (SPY) trades, and generate a dataset as follows.

First, the trades may be split into dollar bars, where each bar contains an equal amount of dollars traded, e.g., US$100 million worth of transactions. Second, for each bar, the Volume-Weighted Average Price (VWAP) may be estimated. Third, the DGP may be fitted on the series of VWAPs. Fourth, a long dataset $\{p_t\}$ may be generated using the Monte Carlo algorithm. Half of the dataset, i.e. a first subset may be used to derive (train and fit) the trading prediction model (training set), and the other half, i.e., a second subset may be used to evaluate (test) the performance of the trading prediction model (testing set).

An investment prediction model may be designed and trained to profit from the DGP associated with the above dataset $\{p_t\}$, specifically using the first subset. Let $\delta_t$ denote a standardized difference between a current log-price $p_t$ and the long-term equilibrium $E_t[p_\infty]$, $\delta_t$ may be expressed by equation 3 below.

$$\delta_t = \frac{p_t - E_t[p_\infty]}{\sqrt{V_t[p_\infty]}} \qquad \text{Equation 3}$$

A possible trading rule may be to enter a short position when $\delta_t = \delta_s$ where $\delta_s$ is the entry level for short positions, enter a long position when $\delta_t = \delta_l$ where $\delta_l$ is the entry level for long positions, and exit when one of two conditions occur: (i) a profit target $\pi_+$ is achieved, or (ii) a stop-loss is reached, $\pi_-$, where both conditions are measured in terms of standardized profit or loss, i.e., risk-adjusted return.

Using the training set of SPY bars, the performance of various trading rules may be estimated.

Figure 7:
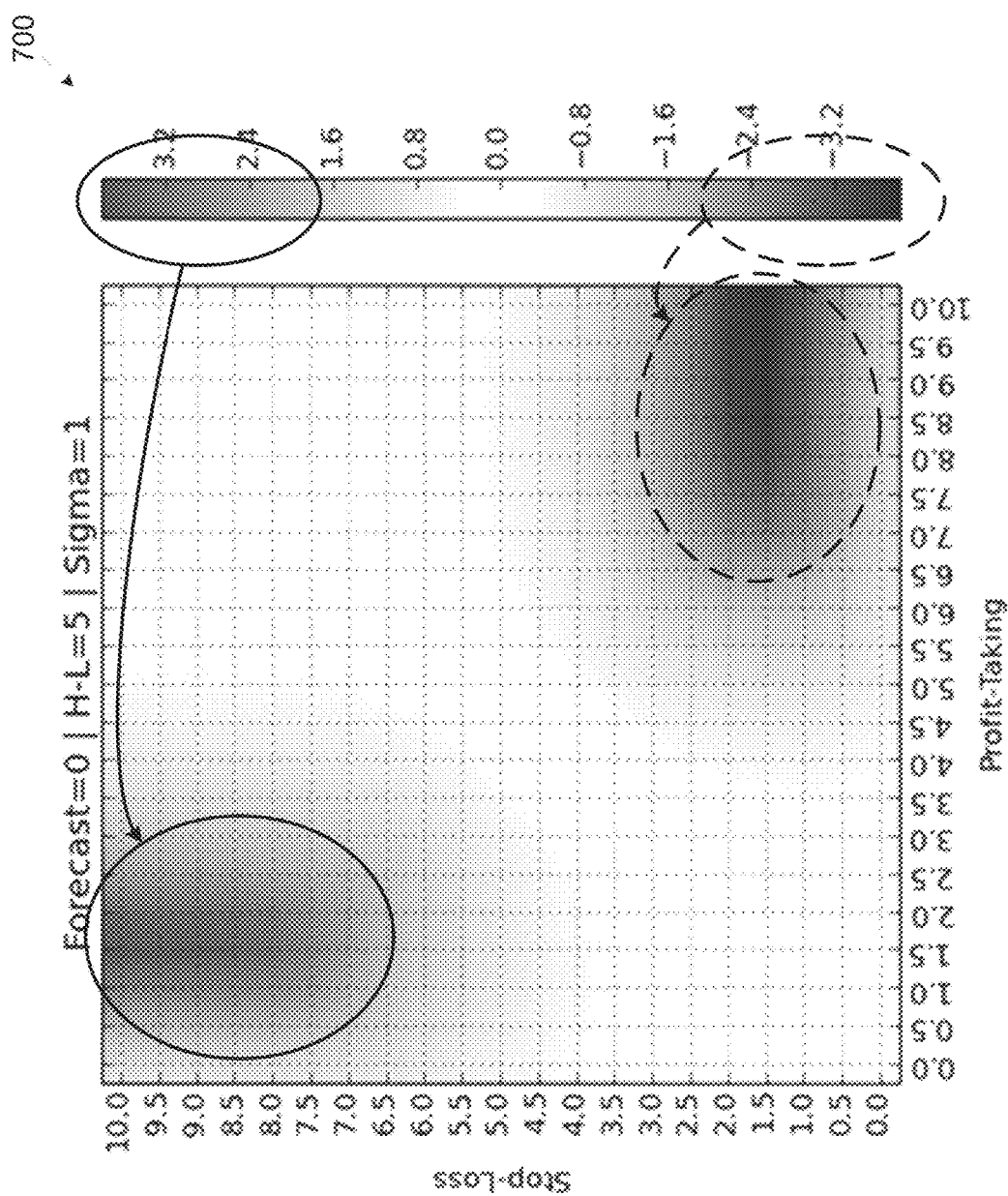
FIG. 7 is a graph chart mapping performance of a plurality prediction models trained to predict optimal outcomes for various trading patterns, according to some embodiments of the present invention.

Reference is now made to FIG. 7, which is a graph chart mapping performance of a plurality prediction models trained to predict optimal outcomes for various trading patterns, according to some embodiments of the present invention.

Graph chart 700 presents Sharpe Ratios associated with exit conditions $\{\pi_-, \pi_+\}$ when $\delta_f=-2$. Accordingly, it may be concluded that the optimal exit conditions when $\delta_f=-2$ occur at $\pi_+=1.5$ and $\pi_-=9$. This set of actions determines the trading prediction model which is recommended for that particular entry condition.

It should be noted that, when the DGP is parametric, a large number of instances may be generated directly where $\delta_f=-2$. However, when the DGP is non-parametric, it is essential to ensure that generated dataset is long enough to contain a sufficiently large number of instances where $\delta_f=-2$.

The investment prediction model may be then applied to produce trading recommendations (instructions) to produce optimal outcomes based on the second subset when certain conditions are met, for example, $\delta_f$ crosses the level $-2$.

Finally, the Sharpe Ratio of the investment prediction model may be evaluated based on the trading recommendations produced by the investment prediction model. The evaluated performance may indicate the quality of the investment prediction model under the hypothesized DGP. The best investment prediction model configuration S may be stored in a database such as the prediction models repository 208 alongside the dataset $\{X, y\}$ generated by the DGP for which the investment prediction model S is optimal.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms prediction models, ML models and neural networks are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of improving quality of computed optimized trading instructions, comprising:
    generating noise reduced and expended training dataset comprising a plurality of simulated trading observations, by:
        accessing at least one external storage device and/or at least one network storage resource;
        fetching from said at least one external storage device and/or said at least one network storage resource a plurality of historical datasets comprising a plurality of past trading observations reflecting a respective one of a plurality of trading patterns;
        deriving from said plurality of past trading observations a plurality of Data Generating Processes (DGPs); and
        generating said noise reduced and expanded training dataset by executing a Monte Carlo algorithm based on a respective one of the plurality of DGPs;
    receiving a dataset comprising a plurality of trading observations;
    accessing a prediction models repository to fetch a plurality of prediction models;
    increasing a quality of computed trading instructions by:
        applying said plurality of prediction models to compute trading instructions to produce optimal outcomes predicted based on the plurality of trading observations, each of the plurality of prediction models is optimized to predict optimal outcomes for a respective one of the plurality of trading patterns by training the respective model through backtesting using the expanded training dataset;
        computing a respective probability score for mapping the received dataset to each of the plurality of DGPs;
        assigning a respective weight to each of the plurality of prediction models according to its respective probability score; and
        computing aggregated trading instructions aggregating the trading instructions for investing a respective portion of an investment according to each of the plurality of prediction models based on its respective weight; and
    outputting the aggregated trading instructions to at least one trading system.

2. The computer implemented method of claim 1, wherein the plurality of trading observations comprise a plurality of trading features observed during a certain recent time period associated with respective outcomes which jointly reflect a current trading pattern.

3. The computer implemented method of claim 1, wherein the plurality of simulated trading observations comprise a plurality of simulated trading features associated with respective simulated outcomes.

4. The computer implemented method of claim 1, further comprising computing the respective probability score for mapping the received dataset to each of the plurality of DGPs based on a comparison between the respective outcomes extracted from the plurality of trading observations and the optimal outcomes computed by each of the plurality of prediction models.

5. The computer implemented method of claim 1, wherein the trading instructions are computed based on trading instructions computed by each of the plurality of prediction models based on a maximal outcome predicted in return to investing its respective portion of the investment.

6. The computer implemented method of claim 1, wherein each of the plurality of prediction models is trained using a first subset of the plurality of simulated trading observations generated based on the respective DGP and tested using a second subset of the plurality of simulated trading observations generated based on the respective DGP, the simulated outcomes of the second subset are not available to the plurality of prediction models.

7. The computer implemented method of claim 6, wherein a prediction performance of each of the plurality of prediction models is tested by comparing between the optimal outcome computed by the respective prediction model for the simulated values of the second subset and the simulated outcomes generated for the second subset by the Monte Carlo simulation algorithm.

8. A system for computing quality improved optimized trading instructions, comprising:
    at least one processor executing a code, the code comprising:
        code instructions to generate noise reduced and expended training dataset comprising a plurality of simulated trading observations, by:
            accessing at least one external storage device and/or at least one network storage resource;
            fetching from said at least one external storage device and/or said at least one network storage resource a plurality of historical datasets comprising a plurality of past trading observations reflecting a respective one of a plurality of trading patterns;
            deriving from said plurality of past trading observations a plurality of Data Generating Processes (DGPs); and
            generating said noise reduced and expanded training dataset by executing a Monte Carlo algorithm based on a respective one of the plurality of DGPs;
        code instructions to receive a dataset comprising a plurality of trading observations;
        code instructions to access a prediction models repository to fetch a plurality of prediction models;
        code instructions to increase a quality of computed trading instructions by:
            applying said plurality of prediction models to compute trading instructions to produce optimal outcomes predicted based on the plurality of trading observations, each of the plurality of prediction models is optimized to predict optimal outcomes for a respective one of the plurality of trading patterns by training the respective model through backtesting using the expanded training dataset;
            computing a respective probability score for mapping the received dataset to each of the plurality of DGPs;
            assigning a respective weight to each of the plurality of prediction models according to its respective probability score; and
            computing aggregated trading instructions aggregating the trading instructions of the prediction models for investing a respective portion of an investment according to each of the plurality of prediction models based on its respective weight; and code instructions to output the aggregated trading instructions to at least one trading system.

9. A computer program product comprising program instructions executable by a computer, which, when executed by the computer, cause the computer to perform a method according to claim 1.

10. A computer implemented method of creating an ensemble of prediction models optimized to predict optimal outcomes for a plurality of trading patterns, comprising:

generating noise reduced and expended training dataset comprising a plurality of simulated trading observations, by:
   accessing at least one external storage device and/or at least one network storage resource;
   fetching from said at least one external storage device and/or said at least one network storage resource a plurality of historical datasets, each of the plurality of historical datasets comprises a plurality of past trading observations comprising a plurality of trading features observed during a past time period associated with respective outcomes, the plurality of trading features and the associated respective outcomes jointly reflect a respective one of a plurality of trading patterns;
   computing a respective Data Generating Processes (DGP) for each of the plurality of trading patterns based on a respective historical dataset; and
   generating said noise reduced and expended training dataset comprising a plurality of simulated trading observations generated by applying a Monte Carlo algorithm based on the respective DGP;

accessing a prediction models repository to fetch a plurality of prediction models;

training each of the plurality of prediction models by backtesting using a respective expanded training dataset, wherein a first subset of the simulated trading observations of the respective expanded training dataset is used for training the respective prediction model and a second subset of the simulated trading observations is used to test the respective prediction model; and outputting the plurality of prediction models each trained using a respective expanded training dataset and thus optimized to predict optimal outcomes for a respective one of the plurality of trading patterns.

11. A system for creating an ensemble of prediction models optimized to predict optimal outcomes for a plurality of trading patterns, comprising:

at least one processor executing a code, the code comprising:
   code instructions to generate noise reduced and expended training dataset comprising a plurality of simulated trading observations, by:
      accessing at least one external storage device and/or at least one network storage resource;
      fetching from said at least one external storage device and/or said at least one network storage resource a plurality of historical datasets, each of the plurality of historical datasets comprises a plurality of past trading observations comprising a plurality of trading features observed during a past time period associated with respective outcomes, the plurality of trading features and the associated respective outcomes jointly reflect a respective one of a plurality of trading patterns;
      computing a respective Data Generating Processes (DGP) for each of the plurality of trading patterns based on a respective historical dataset; and
      generating said noise reduced and expanded training dataset comprising a plurality of simulated trading observations generated by applying a Monte Carlo algorithm based on the respective DGP;
   code instructions to access a prediction models repository to fetch a plurality of prediction models;
   code instructions to train each of the plurality of prediction models by backtesting using a respective expanded training dataset, wherein a first subset of the simulated trading observations of the respective expanded training dataset is used for training the respective prediction model and a second subset of the simulated trading observations is used to test the respective prediction model; and
   code instructions to output the plurality of prediction models each trained using a respective expanded training dataset and thus optimized to predict optimal outcomes for a respective one of the plurality of trading patterns.

12. A computer program product comprising program instructions executable by a computer, which, when executed by the computer, cause the computer to perform a method according to claim 10.

* * * * *